No. 715,615. Patented Dec. 9, 1902.
C. J. SHIPWAY & H. MAY.
SHEEP SHEARS.
(Application filed July 8, 1902.)
(No Model.)

WITNESSES
Wm H Caufield
J. G. Dunbar

INVENTORS:
Cornelius John Shipway, and
Henry May,
BY W. B. Hutchinson ATTORNEY.

UNITED STATES PATENT OFFICE.

CORNELIUS JOHN SHIPWAY AND HENRY MAY, OF MENINGIE, SOUTH AUSTRALIA, AUSTRALIA.

SHEEP-SHEARS.

SPECIFICATION forming part of Letters Patent No. 715,615, dated December 9, 1902.

Application filed July 8, 1902. Serial No. 114,835. (No model.)

*To all whom it may concern:*

Be it known that we, CORNELIUS JOHN SHIPWAY and HENRY MAY, inventors, subjects of the King of Great Britain and Ireland, and residents of Meningie, in the State of South Australia, Commonwealth of Australia, have invented certain new and useful Improvements in Sheep-Shears, of which the following is a specification.

This invention comprises an improved tool for shearing sheep; and its essential features consist in making the blades detachable from the bow and in providing drivers which allow of a very secure grip, whereby the open shears may be easily driven into the wool.

In order that our invention may be clearly understood, we will describe the same with reference to the accompanying drawings, in which—

Figure 1:
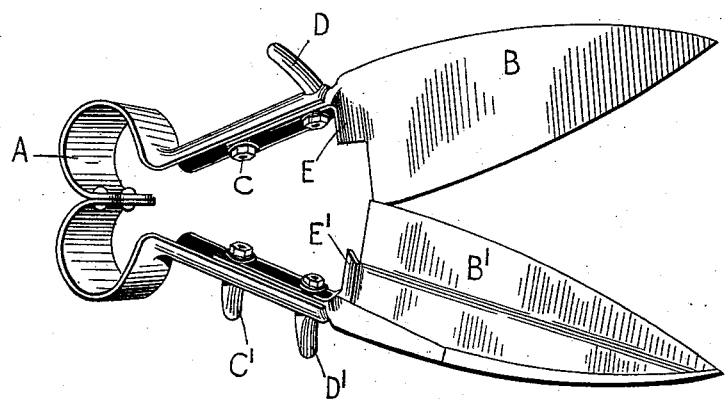
Figure 3:
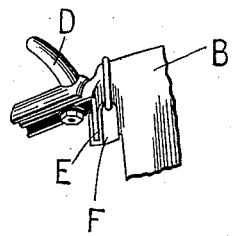
Figure 2:
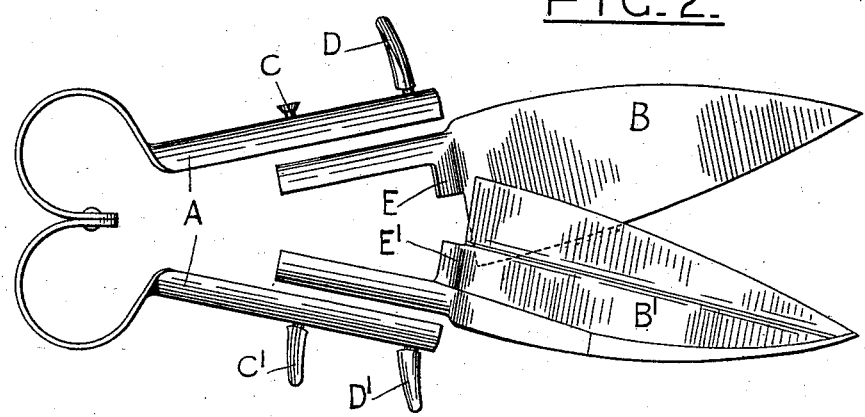

Figure 1 is a general perspective view of a pair of shears constructed according to our invention, but without the knocker-pads. Fig. 2 is a view showing the blades detached from the bow. Fig. 3 is a view showing the method of securing a green-hide pad to the knocker.

In constructing a pair of shears according to our invention the bows and the blades, as shown in the drawings, are made of substantially the usual form. In the shears as heretofore constructed each handle and blade is formed from one continuous piece of metal, whereas according to our invention the blades B B' are made separately from the handles A and each blade is secured thereto by two bolts C and D and C' and D', respectively, which are preferably of special form, as hereinafter described. In order to allow of the blade being secured to the handle, there is a short extension of the rear of the blade formed of such shape as to fit neatly within the hollow of the handle proper and perforated with two holes corresponding to two in the handle. The edges of the blade extension project beyond the edges of the handle to form a seating for the holding-nuts. The connections of the blades to the handles are made as follows: The top (as the shear is used) blade is secured to its handle by two bolts. The rear one, C, has a head finished to correspond exactly with the form of the handle, but the forward one, D, has an elongated and curved head, forming a driver, which serves as a stop and fits neatly between the thumb and first finger of the operator. The bottom blade is secured to its handle by two bolts, each of which has, preferably, an elongated and curved head, forming drivers. The front driver D' fits between the first and second fingers and the rear driver C' between the third and fourth fingers. If preferred, a bolt with plain head instead of the elongated one may be used for the rear fastening. The holes in the blades to take the rear bolts are preferably elongated, thereby permitting of the insertion of packing between the handle and the rear of the extension to widen the blow or cut, if desired, without increasing the width in the grip.

Instead of the drivers being formed by the heads of the bolts, as above described, they may be otherwise formed and secured; but the above construction is what is preferred.

The knockers E E' we make shorter than heretofore sufficient to allow of packing. This packing consists of a green-hide pad F, (shown in Fig. 3,) securely tied to each blade to lessen the noise and prevent the jar upon the wrist as the blades are closed.

With shears as heretofore manufactured the shearer has had by filing and breaking to adjust the spring of each pair of shears to suit his own requirements, and sometimes one blade is much softer than the other, which allows the hard blade to cut into the soft and render the shears valueless. With shears made according to our invention a shearer will be able to get a bow of exactly the size and strength to suit him that will last for many years, and that may be fitted with successive sets of blades, and in the event of one blade being harder than the other (as is often the case) the best can be kept until perfectly matched with a new blade.

The drivers herein described not only enable the shears to be easily driven into the wool, but they also enable the shears to be better directed, and altogether give the operator a much firmer grip upon the tool, which will be found to work perfectly with quite a light spring.

Having now particularly described and ascertained the nature of our said invention and in what manner the same is to be performed, we declare that what we claim is—

1. A sheep-shearing tool, comprising a bow with handles, two blades detachably secured to said handles by bolts, and drivers also secured to said handles, said drivers being formed by the elongated heads of the bolts employed for attaching the blades to the handles, substantially as described.

2. A sheep-shearing tool comprising a bow with handles, two blades detachably secured to said handles, and drivers passing through said handles into said blades and securing the parts together.

In testimony that we claim the foregoing as our invention we have signed our names, in the presence of two witnesses, this 14th day of May, 1902.

CORNELIUS JOHN SHIPWAY.
HENRY MAY.

Witnesses:
CHARLES NICHOLAS COLLISON,
ARTHUR GORE COLLISON.